United States Patent [19]

Takemasa et al.

[11] Patent Number: 5,254,279
[45] Date of Patent: Oct. 19, 1993

[54] NONHAZARDOUS AND ENVIRONMENTALLY NONDESTRUCTIVE REFRIGERANT COMPOSITION

[75] Inventors: Kazuo Takemasa; Yutaka Ohmori, both of Ohta; Jiro Yuzawa, Ohizumi, all of Japan

[73] Assignee: Sanyo Electric Co., Ltd., Osaka, Japan

[21] Appl. No.: 859,820

[22] Filed: Mar. 30, 1992

[30] Foreign Application Priority Data

Apr. 2, 1991 [JP] Japan .................... 3-70081

[51] Int. Cl.$^5$ ................................ C09K 5/04
[52] U.S. Cl. ............................ 252/67; 62/114
[58] Field of Search ................ 252/67; 62/114

[56] References Cited

U.S. PATENT DOCUMENTS 4,810,403  3/1989  Bivens et al. .................. 252/67
4,971,712 11/1990  Gorski et al. ................ 252/52 A
5,053,155 10/1991  Mahler .......................... 252/68

FOREIGN PATENT DOCUMENTS 0419042   3/1991  European Pat. Off. .
271121    8/1989  Fed. Rep. of Germany .
63-105088 5/1988  Japan .

Primary Examiner—Christine Skane
Attorney, Agent, or Firm—Weingarten, Schurgin, Gagnebin & Hayes

[57] ABSTRACT

A refrigerant composition consisting essentially of chlorodifluoromethane, 1-chloro-1, 1-difluoroethane and octafluoropropane, said composition, while preventing the bad influence on ozone layer and maintaining the environment of working place in a nonhazardous condition, can be used as a substitute for R500 or R502 owing to the obtainability of the desired refrigerating capacity and a good return of oil.

3 Claims, 1 Drawing Sheet

NONHAZARDOUS AND ENVIRONMENTALLY NONDESTRUCTIVE REFRIGERANT COMPOSITION

BACKGROUND OF THE INVENTION

1. Field of the Invention

The present invention relates to a refrigerant composition which is used in a refrigeration unit and has few bad influence on the ozone layer.

2. Description of the Prior Art

Heretofore, most refrigerants used for refrigerating machines are R12 (dichlorodifluoromethane) R500 (an azeotropic mixture comprising R12 and R152a (1, 1-difluoroethane)). They are both suitable to ordinary refrigeration units, since the boiling point of R12 is about −30° C. and that of R500 is about −33° C. Further, even if their suction temperature for a compressor is relatively high, their discharge temperature does not rise to the extent that the oil sludge of the compressor is generated. And, further, since R12 has a good compatibility with the oil in the compressor, R12 also performs the role to return the oil in the refrigerant circuit to the compressor.

SUMMARY OF THE INVENTION

However, the abovementioned refrigerants are said to have bad influence on the ozone layer, and, as a result, the regulation for their use has become a reality. A substitute for these regulated refrigerants, which is being studied, is a refrigerant mix of R22 (chlorodifluoromethane) and R142b (1-chloro-1, 1-difluoroethane). R22 has a boiling point of about −40° C., while R142b has a boiling point of about −9.8° C. Since the use of R22 necessitates a fairly low suction temperature of compressor in order to prevent the rise in the discharge temperature, the discharge temperature is lowered by the admixing of R142b. That is, in the case of R142b, the discharge temperature does not rise even if the suction temperature is relatively high.

Further, R142b, which is flammable, is blended with R22 to make a nonflammable composition thereby enhancing the safety.

And, for further enhancement of the safety or in view of the compatibility with oils in refrigerating machines, proposed is a mixture made by admixing the abovementioned refrigerant mix of R142b and R22 further with a small amount of R21, i.e., dichloromonofluoromethane.

The problems, however, are that R21, which is known to have a toxicity, brings about a serious problem of worsening the environment of working place and that, when the weight percentage of R21 is increased in order to increase the compatibility with oils in refrigerating machines, the aggravation of environment of working place becomes more serious and the refrigerating capacity drops due to the higher boiling point of R21, i e., 8.95° C.

OBJECT OF THE INVENTION

The present invention has been made in view of the abovementioned situation, and the object of the present invention is to provide a refrigerant composition which can increase the refrigerating capacity while preventing the toxicity-derived worsening of the environment of working place and which naturally has few bad influence on the ozone layer.

DETAILED DESCRIPTION OF THE INVENTION

Figure 1:
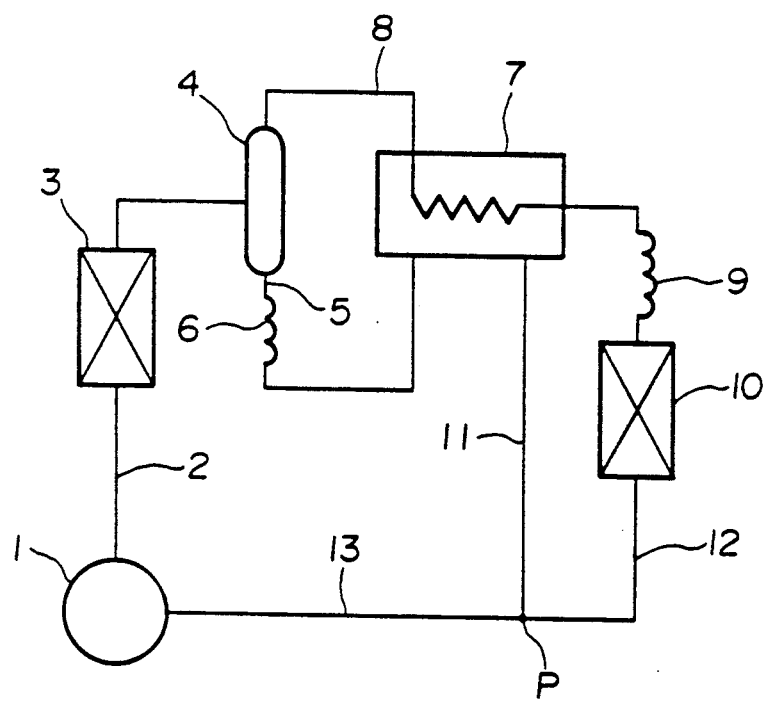
FIG. 1 is a refrigerant circuit which is charged with the refrigerant mix according to the present invention

The present invention provides a refrigerant composition which, as in claim 1, comprises chlorodifluoromethane, 1- chloro-1,1-difluoroethane and octafluoropropane.

Also, the present invention provides a refrigerant composition which, as in claim 2, comprises 75 to 99% by weight of chlorodifluoromethane and 1-chloro-1,1difluoroethane and 1 to 25% by weight of octafluoropropane.

Octafluoropropane or R218 is not an object of the regulation with respect to the problem of bad influence on ozone layer. It has a boiling point of −36.7° C., the ratio of specific heat of 1.06 as described later in detail and almost no toxicity. Therefore, it can control the bad influence on ozone layer and can also maintain the nonhazardousness in working environment.

Also, because of its boiling point as low as −36.7° C., R218 can be evaporated together with R22 by an evaporator in a circuit of refrigerant And, because of its ratio of specific heat of 1.06, which is lower than that of R22, i.e., 1.18, R218 can suppress the rise in discharge temperature of compressor due to R22 . As a result, the desired refrigerating capacity can be realized and oil sludge or the deterioration of oil can be controlled.

As for the problem that R218 has a poor compatibility with oil, the problem can be dealt with by securing a predetermined amount of R22 which has a better compatibility with oil. The locking, etc. due to the refrigerating machine getting out of oil can be prevented by returning the oil in the circuit of refrigerant to the compressor by use of R22 as a carrier.

Besides, R142b is not an object of the regulation with respect to the problem of bad influence on ozone layer, either. And, because of its lower ratio of specific heat, i.e., 1.11, it can suppress the rise in discharge temperature of compressor as in the case of the aforementioned R218 and control the generation of oil sludge, etc.

As stated above, by selecting a refrigerant composition which comprises 75 to 99% by weight of chlorodifluoromethane (R22) and 1-chloro-1, 1-difluoroethane (R142b) and 1 to 25% by weight of octafluoropropane (R218), all the matters can be dealt with, which include the prevention of the bad influence on ozone layer, prevention of health hazards in working place, securing refrigerating capacity, control of discharge temperature of compressor and compatibility with oil.

By selecting the abovementioned refrigerant mix of the present invention, the low temperature zone of −33° to −45° C. can be realized, and this refrigerant mix can substitute for R500 or R502.

DESCRIPTION OF THE PREFERRED EMBODIMENTS

Below, the example is explained by referring to the drawing FIG. 1 illustrates a refrigerant circuit by use of a refrigerant mix comprising R22, R142b and R218. A tube at 2 on the discharge side of a compressor at 1 is connected to a condenser at 3 which is connected to a gas-liquid separator at 4. A tube at 5 for liquid phase, which comes out of the gas-liquid separator 4, is connected to a capillary tube at 6 which is connected to an intermediate heat exchanger at 7. A tube at 8 for vapor phase, which comes out of the gas-liquid separator 4, is connected through the intermediate heat exchanger 7 to a capillary tube at 9 which is connected to an evaporator at 10. A tube at 11, which comes out of the intermediate heat exchanger 7, and a tube at 12 which comes out of the evaporator 10, converge at a junction at P to be connected to a tube at 13 on the suction side of the compressor 1.

The refrigerant circuit is charged with a non-azeotropic refrigerant mix comprising R22, R142b and R218. Next, the operation is explained. The gaseous refrigerant mix at a high temperature and high pressure, which is discharged from the compressor 1 flows into the condenser 3 for heat radiation, and R142b, out of the gaseous refrigerant mix, becomes liquid and enters the gas-liquid separator 4, where the separation takes place so that the liquid R142b goes to the tube 5 for liquid phase while R22 and R218, still in a gaseous state, go to the tube 8 for vapor phase. R142b, flown into the tube 5, for liquid phase, undergoes decompression by the capillary tube 6 and flows into the intermediate heat exchanger 7 for evaporation.

On the other hand, R22 and R218, flown into the tube 8 for vapor phase, while they pass the inside of the intermediate heat exchanger 7, are cooled to condensation by R142b which evaporates there, and flow, after undergoing decompression by the capillary tube 9, into the evaporator 10 to therein evaporate successively (first R22, which has a lower boiling point, evaporates and then R218) thereby cooling the surroundings.

R142b, coming out of the intermediate heat exchanger 7, flows via the tube 11 while R22 and R218, coming out of the evaporator 10, flow via the tube 12, and they converge at the junction P thereby reverting to the mixture of R22, R142b and R218 to return to the compressor 1.

The oil of the compressor 1, which circulates in the refrigerant circuit, circulates, in a state where the oil is dissolved in R22, in the refrigerant circuit and is caused to return to the compressor 1.

When determining the composition of the refrigerant mix to be charged into the refrigerant circuit, it is necessary to take into account the matters, which include, in addition to the prevention of the bad influence on ozone layer, prevention of health hazards in working place, securing refrigerating capacity, control of discharge temperature of compressor and compatibility with oil.

Octafluoropropane or R218, which contains no chlorine, is not an object of the regulation with respect to the problem of bad influence on ozone layer. This compound has a boiling point of $-36.7°$ C. and the ratio of specific heat of 1.06. Further, it has been confirmed that the compound has almost no toxicity by official testing institutions (e.g., T.V.K., a U.S. testing institution).

Therefore, the compound can control the bad influence on ozone layer and can also maintain the nonhazardousness in working environment.

Here, the value K (Cp/Cv), which is illustrated by the following equation (1), exerts a significant influence on the discharge gas temperature of a compressor in adiabatic compression and is the smaller, the larger the molecular weight of the composition.

$$T_2 = T_1(P_2/P_1)^{(K-1/K)} \quad (1)$$

Where, $T_1$ : Suction gas temperature (°K.)
$T_2$ : Discharge gas temperature (°K.)
$P_1$ : Suction pressure (Kg/cm² abs)
$P_2$ : Discharge pressure (Kg/cm² abs)
K : Ratio of specific heat (Cp/Cv)
Cp : Specific heat at a constant pressure
Cv : Specific heat at a constant volume Because of its ratio of specific heat of 1.06, which is lower than that of R22, i e., 1.18, R218 can sufficiently suppress the rise in discharge temperature of compressor. As a result, the generation of oil sludge or the deterioration of oil in the compressor can be controlled.

Incidentally, since R142b has a ratio of specific heat of 1.11, which is also lower than that of R22, it can contribute to the reduction of the discharge temperature of compressor as in the case of R218 which is stated above.

Also, because of its boiling point as low as $-36.7°$ C., R218 can be evaporated together with R22 by the evaporator 10 in a circuit of refrigerant thereby enhancing the refrigerating capacity.

Here, according to the experiments conducted by the applicant, the following has been confirmed.

First, there were prepared a conventional refrigerant mix A comprising 70% by weight of R22 and 30% by weight of R142b, a commercially available refrigerant B comprising R502, a refrigerant mix C, according to the present invention, comprising 70% by weight of R22, 25% by weight of R142b and 5% by weight of R218, and a refrigerant mix D, according to the present invention, comprising 70% by weight of R22, 5% by weight of R142b and 25% by weight of R218. Then, these A through D refrigerants were each charged into the same refrigerating machine mounted with the same insulated box and the same compressor. The experiments, which were thereafter conducted in the same conditions including the temperature of the surroundings, gave the evaporation temperatures for the abovementioned refrigerants: $A = -28°$ C., $B = -36°$ C., $C = -31°$ C. and $D = -35°$ C.

As indicated above, the refrigerant mix C according to the present invention can provide the same level of refrigerating capacity as that of the conventional refrigerant mix A or of R500 (b.p. $= -33.45°$ C.), and therefore the refrigerant mix C can substitute for these refrigerants.

Also, the refrigerant mix D according to the present invention can provide the same level of refrigerating capacity as that of the refrigerant B, i.e., R502, and therefore the refrigerant mix D can substitute for R502.

Besides, according to the experiments, the return of oil was good, and there was observed almost no generation of sludge. This fact supports that, owing to the compatibility of R22, the oil return was satisfactory.

As stated above, the incorporation of R218 brings about such as a significant effect that the refrigerating capacity increases and the discharge temperature of the compressor decreases. The increase in weight percentage of this R218, however, means the decrease in weight percentage of R218. Therefore, it has to be taken into account that R22 has a good compatibility with oil and that R218 is at present a rare and very expensive refrigerant. Consequently, these points along with the effect supported by the experiments lead to the conclusion that a preferred refrigerant composition comprises 75% to 99% by weight of R22 and R142b and 1 to 25% by weight of R218 in case the desired evaporation temperature zone is, for example, $-33°$ to $-45°$ C.

In the abovementioned mixing ratio, as in the case of R218, the increase in the weight percentage of R142b can contribute to the reduction of the discharge temperature of the compressor. However, as explained in the example of the prior art, the increase to the extremity in the weight percentage of R142b, which is flammable, can cause explosion. Meanwhile, R142b, like R218, has a poor compatibility with oil. In this sense, in order to avoid these problems, the abovementioned mixing range is defined.

As stated above, according to the present invention, there is provided a practically excellent refrigerant composition which, while preventing the bad influence on ozone layer and maintaining the environment of working place in a nonhazardous condition, can be used as a substitute for R500 or R502 owing to the obtainability of the desired refrigerating capacity and a good return of oil.

What is claimed is:

1. A ternary refrigerant composition consisting essentially of from 75 to 99 wt % of chlorodifluoromethane and 1-chloro-1,1-difluoroethane and from 1 to 25 wt % of octafluoropropane, wherein the proportion of said chlorodifluoromethane ranges from 2.8 parts by weight per part by weight of said 1-chloro-1,1-difluoroethane to 14 parts by weight per part by weight of said 1-chloro-1,1-difluoroethane.

2. The ternary refrigerant composition of claim 1, consisting of 70 wt % chlorodifluoromethane, 25 wt % 1-chloro-1,1-difluoroethane, and 5 wt % octafluoropropane.

3. The ternary refrigerant composition of claim 1, consisting of 70 wt % chlorodifluoromethane, 5 wt % 1-chloro-1,1-difluoroethane, and 25 wt % octafluoropropane.

* * * * *

UNITED STATES PATENT AND TRADEMARK OFFICE
CERTIFICATE OF CORRECTION

PATENT NO. : 5,254,279
DATED : October 19, 1993
INVENTOR(S) : Kazuo Takemasa

It is certified that error appears in the above-indentified patent and that said Letters Patent is hereby corrected as shown below:

Column 2, line 4, "invention" should read --invention.--.

Column 2, line 62, "drawing FIG. 1" should read --drawing. FIG. 1--.

Column 4, line 58, "R218" should read --R22--.

Signed and Sealed this

Twentieth Day of September, 1994

Attest:

BRUCE LEHMAN

*Attesting Officer*  *Commissioner of Patents and Trademarks*